March 14, 1944.  C. W. CHERRY ET AL  2,344,128

RIVET

Original Filed May 24, 1940

INVENTORS
CARL W. CHERRY
ALEX S. MULLGARDT
BY George B. White
ATTORNEYS

Patented Mar. 14, 1944

2,344,128

UNITED STATES PATENT OFFICE 2,344,128

RIVET

Carl W. Cherry, Carmel, and Alex S. Mullgardt, Altadena, Calif.; said Mullgardt assignor to said Cherry Original application May 24, 1940, Serial No. 337,028, now Patent No. 2,317,360, dated April 27, 1943. Divided and this application March 27, 1943, Serial No. 480,869

2 Claims. (Cl. 85—40)

This invention relates to rivets.

This is a divisional application of our application Serial No. 337,028, filed May 24, 1940, issued as Patent No. 2,317,360, April 27, 1943.

An object of this invention is to provide a rivet assembly of the type wherein a tension member in a hole of a hollow rivet is pulled for forming the tail of the rivet against the object to be fastened.

Another object of this invention is to provide such rivet assembly so that the stem or tension member is held in a predetermined position in the hollow rivet while it is handled prior to riveting; the stem is held with sufficient tightness to prevent sliding or displacement of the riveting stem under usual handling or operations, but it will permit the sliding of the stem through the hole of the hollow rivet under the pulling which is applied for riveting.

Another object of the invention is to provide a rivet assembly wherein a tension member is held in a predetermined position in a hollow rivet so that the tail former at an end of a stem is adjacent to the tail end of the hollow rivet and a gripping portion or gripping head at the other end of the stem is held uniformly spaced from the head of the hollow rivet; the holding of this stem in the adjusted position is sufficient to prevent displacement of the stem in the hollow rivet under normal handling, but it permits the relative axial pulling of the stem when the stem is pulled by riveting which is during actual riveting operation.

With the foregoing and other objects in view, which will be made manifest in the following detailed description, reference is had to the accompanying drawing for the illustrative embodiment of the invention, wherein.

In order to provide rivet assemblies the parts of which are in uniform relative position for easy handling and insertion into riveting tools, the stem is engaged with the hollow rivet with sufficient tightness to hold the assembly in predetermined relative position but to yield to the pulling force exerted when the rivet is fastened in place.

Figure 1:
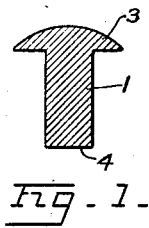
Fig. 1 is a sectional view of a solid rivet body.
Figure 2:
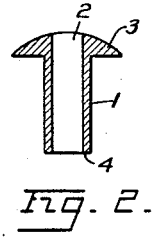
Fig. 2 is a sectional view of the solid rivet body with an axial hole through it.

The first step of making such rivet assemblies is the step of providing a hollow rivet body. At present the preferred method is to provide a solid rivet body 1 shown in Fig. 1 and drill or bore an axial hole 2 through the entire rivet body extended from its head 3 to its tail 4, as shown in Fig. 2.

Figure 3:
Fig. 3 is a side view of the stem of the rivet.
Figure 4:
Fig. 4 is a view of the rivet stem with the former head thereon.
Figure 5:
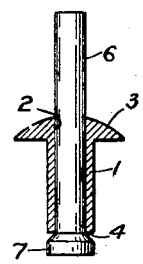
Fig. 5 is the stem assembled in the hole of the rivet body.
Figure 6:
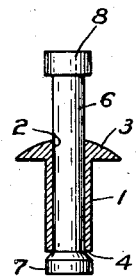
Fig. 6 is the completed rivet assembly with the gripping head on the end of the stem beyond the rivet head and the stem held in said position in the rivet.

The next step is to provide a stem 6, as shown in Fig. 3, to slidably fit into the axial hole of the rivet body 1. On one end of the rivet stem 6 is then formed a tail former 7, as shown in Fig. 4. This step is at present performed on the rivet stem before its assembly in the rivet body.

The next step is to insert the rivet stem into the hole of the rivet body. This insertion is accomplished through the tail end of the rivet body so that the tail former is adjacent to the tail and the straight end of the stem extends through the head of the rivet body 1. It is to be noted that the stem is comparatively easily slidable into the hole of the rivet body.

The next step is to apply a forming force to the straight end of the rivet stem for forming a pulling or gripping surface on the straight end of the stem outside the rivet head. In the herein disclosed form this is accomplished by exerting axial pressure upon the straight end of the rivet stem so as to bear against the formed end of the rivet stem, and to confine the enlargement of the stem at the pulling head 8 to a predetermined limited end portion of the stem spaced from the head of the rivet body. The entire rivet body is held exteriorly against deformation. Also preferably simultaneously with the forming step the stem in the rivet is expanded sufficiently to tighten the sliding fit between the hollow rivet body and the stem to hold them assembled in a predetermined relation and preferably so that the former is immediately adjacent to the tail end of the hole of the rivet body.

The product is a rivet assembly which includes a hollow rivet body, a stem slidable through the rivet body, a former on the end of the rivet stem adjacent the tail end of the rivet body, a pulling member at the other end of the stem spaced from the rivet head, said stem being slidable to be pulled in the hole of the rivet body but normally it is held tightly in place in said rivet body so as to hold the former and the pulling member on the stem in a predetermined constant relation to the rivet body of the assembly. This provides rivet assemblies with uniform outlines to facilitate their insertion and handling in suitable riveting apparatus.

Figure 7:
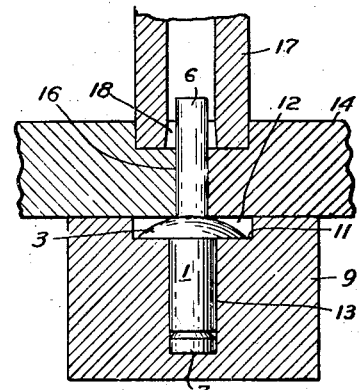
Fig. 7 is a somewhat diagrammatic view of the holding of the rivet assembly for the forming of the gripping head on the stem.
Figure 8:
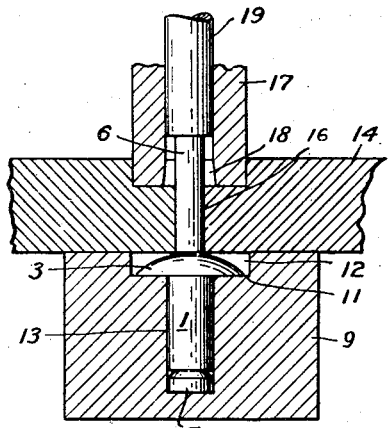
Fig. 8 is a somewhat diagrammatic view of the step of exerting the forming pressure on the rivet stem of the rivet.
Figure 9:
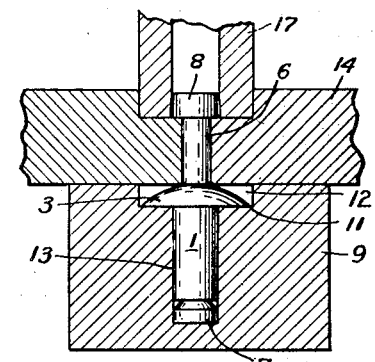
Fig. 9 is a somewhat diagrammatic view of the step of completion of the forming of the grip or pulling head of the rivet stem.

The carrying out of the step involving the forming of the pulling head is illustrated in Figures 7, 8, and 9 herein. The rivet body 1 is held in a holder 9 so that the bottom surface of the rivet head 3 rests on the bottom 11 of a recess 12 in said holder 9. The recess 12 is of the same height as the height of the rivet head 3 so as to protect the rivet head against pressure thereon. The rivet body 1 fits into a hole 13 of the holder 9. The depth of the holder hole 13 is equal to the distance from the bottom or outer end of the former 7 and the bottom surface of the rivet head 3 when the stem 6 is fully inserted into the rivet hole 2. On the top of the holder 9 rests a stem holder 14 which has an aperture 16 fitting accurately over the portion of the stem 6 from the top of the rivet head 3 to a point spaced from the upper or straighter end of said stem 6. Over the uncovered end portion of the stem 6 extends a die 17 which has a tapered cavity 18 in its end overlying the stem 6. The cavity 18 is larger than the stem diameter and is of the desired head contour. As shown in Fig. 8, a plunger 19 moves in said die 17 to axially engage the end of the stem 6. The pressure member of plunger 19 is moved down so as to apply gradually progressive axial compression on the end of the rivet stem 6 until the portion of the rivet stem 6 within the die cavity 19 is enlarged to fill said die cavity 19. This same axial pressure effects an almost imperceptible enlargement of the stem 6 within the hollow rivet body 1 which however is sufficient to tighten the fit therein without deforming said rivet body 1. The gradual application of the axial compressive force in such limited area and the independent support of the rivet body produce a rivet assembly of properly balanced initial strain conditions with uniform spacing of heads so as to secure objects together with substantially uniform force. Uniformity of performance in riveting operations is of utmost importance, and rivets made in accordance with this method can be handled by the same tool speedily and respond uniformly under given conditions.

We claim:

1. A rivet assembly comprising a tubular rivet having a head formed at an end thereof, a rivet stem extended through the rivet, a former head on the stem, adjacent the other end of the tubular rivet, said rivet stem being expanded against the interior of said tubular rivet into frictional engagement with the inner surface of said tubular rivet.

2. A rivet assembly comprising a tubular rivet having a head formed at an end thereof, a rivet stem extended through said tubular rivet, a former head on the stem adjacent the tail end of the rivet, and engagement means on the stem spaced outwardly from the rivet head, the rivet stem being expanded into frictional engagement with the inner surface of the tubular rivet for holding said stem and the former head and engagement thereon in predetermined assembled position with respect to said tubular rivet.

CARL W. CHERRY.
ALEX S. MULLGARDT.